United States Patent [19]

Klein et al.

[11] Patent Number: 5,623,016
[45] Date of Patent: Apr. 22, 1997

[54] AQUEOUS, AUTOCROSSLINKING POLYURETHANE-VINYL HYBRID DISPERSIONS

[75] Inventors: Heinz-Peter Klein, Mainz; Joerg-Peter Geisler, Ingelheim, both of Germany

[73] Assignee: Hoechst Aktiengesellschaft, Frankfurt, Germany

[21] Appl. No.: 456,321

[22] Filed: Jun. 1, 1995

Related U.S. Application Data

[62] Division of Ser. No. 327,495, Oct. 21, 1994.

[30] Foreign Application Priority Data

Oct. 23, 1993 [DE] Germany ............... 43 36 206.0

[51] Int. Cl.⁶ .................................................. C08L 31/04
[52] U.S. Cl. ................... 524/591; 524/839; 524/848
[58] Field of Search ............................. 524/591, 839, 524/840, 501

[56] References Cited

U.S. PATENT DOCUMENTS

| | | | |
|---|---|---|---|
| 3,169,945 | 2/1965 | Hostettler et al. | 260/78.3 |
| 3,455,861 | 7/1969 | Bresciani et al. | 260/29.6 |
| 3,862,074 | 1/1975 | Hickey | 260/29.6 |
| 4,267,091 | 5/1981 | Geelhaar et al. | 260/29.6 |
| 4,529,772 | 7/1985 | Druschke et al. | 524/555 |
| 4,948,829 | 8/1990 | Mitsuji et al. | 524/457 |
| 5,070,136 | 12/1991 | Dersch et al. | 524/555 |

FOREIGN PATENT DOCUMENTS

| | | |
|---|---|---|
| 0098752 | 1/1984 | European Pat. Off. . |
| 0167188 | 1/1986 | European Pat. Off. . |
| 0189945 | 8/1986 | European Pat. Off. . |
| 0308115 | 3/1989 | European Pat. Off. . |
| 332326 | 9/1989 | European Pat. Off. . |
| 0332011 | 9/1989 | European Pat. Off. . |
| 0332326 | 9/1989 | European Pat. Off. . |
| 0379158 | 7/1990 | European Pat. Off. . |
| 0522419 | 1/1993 | European Pat. Off. . |
| 0522420 | 1/1993 | European Pat. Off. . |
| 1595393 | 4/1970 | Germany . |

OTHER PUBLICATIONS

Chemical Abstracts, vol. 120, No. 11, May 1994, Abstract No. 273199q "Manufacture Of Aqueous Emulsions Of Acrylic Polyurethanes", and JP-A-5,320,299.

Derwent Publications, Ltd., AN 224347, "Epoxy Resin Composition", and JP-A-5 148 337, published Jun. 15, 1993.

*Primary Examiner*—Jeffrey T. Smith
*Attorney, Agent, or Firm*—Foley & Lardner

[57] ABSTRACT

Aqueous, autocrosslinking polymer dispersion binders comprising polyhydrazides and carbonyl-containing polyurethane-vinyl hybrid polymers and also, if desired, conventional additives, are useful in base coatings, aqueous coatings, adhesives and printing inks.

6 Claims, No Drawings

AQUEOUS, AUTOCROSSLINKING POLYURETHANE-VINYL HYBRID DISPERSIONS

This application is a division of application Ser. No. 08/327,495, filed Oct. 21, 1994, pending.

BACKGROUND OF THE INVENTION

1. Field of the Invention

The present invention relates to aqueous polyurethane dispersion binders and processes for their production. The binders may be used, for example, in basecoatings, aqueous coatings, adhesives and printing inks.

2. Description of Related Art

Coating systems based on aqueous polyurethane dispersions have grown in importance over the last 15 years across a fairly broad range of applications because of their beneficial properties. These properties include adhesion to a variety of substrates, abrasion resistance, flexibility and toughness. Polyurethane dispersions are particularly suitable for the coating of metallic and mineral substrates and for coating plastics and wood. Polyurethane resins are generally stabilized in the aqueous phase by means of external emulsifiers, or by the incorporation of adequate quantities of ionic or nonionic groups into the polyurethane resin. The pattern of properties of polyurethane dispersions can be modified by, for example, adding vinyl polymer dispersions. U.S. Pat. No. 3,862,074, DE 39 15 459 and EP 0 379 158, selected by way of example, describe aqueous coating systems which can be prepared simply by mixing a polyurethane dispersion with acrylate dispersions.

Specific processes for preparing vinyl polymers, in which vinyl monomers are polymerized in the presence of aqueous polyurethane dispersions, are described in, for example, the patent documents EP 0 098 752, EP 0 167 188, EP 0 189 945, EP 0 308 115, EP 0 522 419 and EP 0 522 420. In the case of patent documents EP 0 189 945 and EP 0 308 115, the mixture of polyurethanes and vinyl polymers is prepared via the stage of a water-dispersible, isocyanate-terminated polyurethane resin which is synthesized in a solution of vinyl monomers and undergoes chain extension after transfer to the aqueous phase. This is followed by a free-radical polymerization in which further vinyl monomers can be added. In contrast, the patent document EP 0 167 188 discloses a process permitting the preparation of polyurethane-acrylate hybrid dispersions via the intermediate stage of an isocyanate-terminated polyurethane resin with terminal acryloyl groups. After dilution with compounds capable of undergoing free-radical polymerization, this unsaturated prepolymer is dispersed in the aqueous phase and subjected to chain extension. This is followed by a free radical-initiated polymerization in the aqueous phase, to give a one-component dispersion having chemically bonded polyurethane and acrylate blocks.

EP 0 098 752, EP 0 522 419 and EP 0 522 420 likewise describe processes for preparing polyurethane-acrylic hybrid dispersions. They differ from the process disclosed in patent document EP 0 167 188 in that the synthesis of the polyurethane-acrylic hybrid dispersions is carried out via the stage of polyurethane macromonomers having terminal or lateral α,β-olefinically unsaturated groups, which do not possess terminal isocyanate groups and therefore cannot be chain-extended in the aqueous phase. Here too, after transfer of these polyurethane macromonomers to the aqueous phase, a free radical-initiated polymerization is carried out in the presence of mono- and/or polyfunctional vinyl monomers. None of the above mentioned polyurethane-vinyl hybrid dispersions or mixtures of polyurethane and vinylpolymer dispersions is autocrosslinked at room temperature or at low temperatures.

Vinyl polymers containing carbonyl groups were first mentioned in the patent literature more than 20 years ago. They are generally prepared by an emulsion polymerization process, by polymerization of carbonyl-containing vinyl monomers with other vinyl monomers. Examples of such processes are given in patent documents DE 15 95 393, DE 28 19 092, EP 0 127 834 and EP 0 332 011.

Autocrosslinking aqueous coating systems based on mixtures of polyurethane resins and vinyl polymers are disclosed in patent document EP 0 332 326. In this patent autocrosslinking is achieved via azomethine linkages which are the result of a reaction between hydrazine and carbonyl groups. Crosslinking in these coating compositions involves the participation of at least one polyurethane resin which has hydrazine or carbonyl groups in the polymer backbone.

A preferred variant preparation of the polyurethane polymer disclosed in EP 0 332 326 is its synthesis in vinyl monomers which, after the dispersion of the polyurethane resin in aqueous medium, are subjected to free-radical polymerization. This process leads to a polymer mixture comprising polyurethane resin and vinyl polymer.

The patent document also mentions mixtures of polyurethane polymers and vinyl polymers, both of which carry carbonyl groups and can be crosslinked by polyhydrazides. Where a carbonyl function is involved, it is incorporated into the polyurethane resin during the synthesis of the prepolymer and/or during the chain extension process. Both possibilities require isocyanate-reactive compounds having carbonyl functions. The crosslinking of this carbonyl-containing polyurethane resin can be carried out using hydrazine-containing polyurethane polymers and vinyl polymers, and with polyhydrazides which are not of the polyurethane or vinyl type. In this case the urethane polymers and vinyl polymers are present as a purely physical mixture. It is known that such systems have a tendency to separate, resulting not only in an inadequate storage stability but also in an impairment of the mechanical properties, the resistance properties and the appearance of the film (e.g., defects in gloss, hazy films).

SUMMARY OF THE INVENTION

One object of the present invention is to provide autocrosslinking binders which are based on urethane polymers and vinyl polymers and which have no tendency to separate.

Another object of the present invention is to provide a process for the production of the autocrosslinking polymer binders. Still another object is to provide, inter alia, a basecoat, an aqueous coating system, an adhesive and a printing ink which include the autocrosslinking polymer binders. Yet another object of the present invention is provide a method of using the basecoat and aqueous coating in a coating process. Still another object of the present invention is to provide a method of using the adhesive in an adhesive bonding process. Yet another object of the present invention is to provide a process of using the printing ink in a printing process.

In accomplishing the foregoing objects, there has been provided according to one aspect of the present invention an aqueous, autocrosslinking polymer binder, which includes polyhydrazides and carbonyl-containing urethane-vinyl hybrid polymers.

Another aspect of the present invention provides a process for the production of the autocrosslinking polymer binder. The process includes reacting polyhydroxy compounds, polyisocyanates compounds, vinyl monomers and hydrophilic monomers which contain hydrophilic groups to form a vinyl-containing urethane macromonomer; and reacting the vinyl-containing urethane macromonomer with further vinyl monomers by free radical-initiated polymerization, wherein at least one of the further vinyl monomers contains one or more carbonyl groups.

The present invention also provides a basecoat for a multi-coating system which includes the autocrosslinking polymer binder and a pigment.

The present invention also provides and aqueous coating system which includes the autocrosslinking polymer binder and at least one of conventional crosslinking agents, pigments, wetting agents, antifoams, leveling agents, waxes, slip additives, stabilizers, catalysts, fillers, plasticizers and solvents.

The present invention further provides an adhesive for adhesive bonding of a substrate which includes the autocrosslinking polymer binder and at least one of plasticizers, solvents, film-binding auxiliaries, fillers, natural resins and synthetic resins.

The present invention also provides a printing ink which includes the autocrosslinking polymer binder and at least one of soluble dyes, insoluble dyes and pigments.

The present invention also provides a method of coating a substrate with a basecoat which includes the step of applying the basecoat of the present invention to a substrate such as metals, wood and plastics.

Further objects, features and advantages of the present invention will become apparent from the detailed description of preferred embodiments which follows.

DETAILED DESCRIPTION OF THE PREFERRED EMBODIMENTS

The present invention comprises aqueous, autocrosslinking binders which include polyhydrazides and dispersions of carbonyl-containing polyurethane-vinyl hybrid polymers. These binders are stable on storage and are able to crosslink at low temperatures, during and/or after the formation of the film, via azomethine linkages which result from the reaction of the hydrazides with the carbonyl groups of the polyurethane-vinyl hybrid polymer. The polyurethane-vinyl hybrid dispersions are generally prepared by free radical-initiated polymerization of ionically and/or nonionically stabilized polyurethane macromonomers, which possess terminal and/or lateral vinyl groups and, if desired, terminal hydroxyl, urethane, thiourethane or urea groups, with carbonyl-containing and other functional and nonfunctional vinyl monomers.

The term "carbonyl function" refers to the carbonyl group of a ketone or aldehyde compound. The term "hydrazide function" refers to the hydrazine, hydrazide or hydrazone group of an organic hydrazine, hydrazide or hydrazone compound. The binder compositions of the present invention generally contain hydrazide and carbonyl groups in a ratio of preferably from about 1:40 to about 2:1, particularly preferably from about 1:20 to about 2:1.

The components of the polyurethane-vinyl hybrid dispersions are polyhydroxy compounds (A), polyisocyanates (B), vinyl monomers (C), which contain at least one group which is reactive toward isocyanate and at least one vinyl group, hydrophilic monomers (D), which contain at least one nonionic, hydrophilic group and/or at least one ionic or ionogenic group, and further vinyl monomers (E), of which at least one (Ec) has a carbonyl function. These polyurethane-vinyl hybrid dispersions are crosslinked by reaction with the polyhydrazides (F), with the formation of azomethine linkages.

The polyhydroxy compounds (A) include any known in the art, and are generally selected, for example, from polyhydroxypolyethers (A1), polyhydroxypolyesters (A2), polyhydroxypolyesteramides (A3), polyhydroxypolycarbonates (A4) and polyhydroxypolyolefins (AS). Possible additions to the compounds (A) include low molecular weight glycols, for example, glycol itself, di- or triethylene glycol, 1,2-propanediol or 1,3-propanediol, 1,4-butanediol, neopentyl glycol, hexane-1,6-diol, cyclohexanedimethanol, 2,2-bis(4'-hydroxycyclohexyl)propane and polyhydric alcohols such as trishydroxyalkylalkanes (e.g., trimethylolpropane) or tetrakishydroxyalkylalkanes (e.g., pentaerythritol). These polyhydroxy compounds can be employed either individually or as a mixture. Other polyhydroxy compounds suitable for the polyurethane-vinyl hybrid dispersion may also be used.

The polyhydroxypolyethers (A1) may, for example, be polyetherdiols of the formula:

in which R is hydrogen or an alkyl radical having up to 6 carbon atoms, which may have further substituents, n is an integer from 2 to 6 and m is an integer from 10 to 120. Examples are polyethylene glycols, polypropylene glycols, copolymers thereof, and polytetramethylene glycols. Polypropylene glycols having a molecular weight of from 400 to 5000 g/mol are preferred. Other suitable polyhydroxypolyethers are branched polyhydroxypolyethers with the structure:

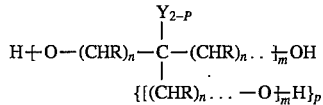

in which
n, n', n" and n'"=1 to 6
m=10 to 120
p=0, 1, 2, and
Y=H, alkyl.

The branched polyhydroxypolyethers are obtained, for example, by reaction of tri- or higher polyhydric alcohols, such as glycerol, trimethylolpropane and pentaerythritol, with epoxides such as ethylene oxide and/or propylene oxide. Other suitable polyhydroxypolyethers suitable as a polyhydroxy compound for the polyurethane-vinyl hybrid may also be used.

The polyhydroxy polyesters (A2) are generally prepared by esterification of polycarboxylic acids or their anhydrides with organic polyhydroxy compounds. The polycarboxylic acids and the polyhydroxy compounds may be aliphatic, aromatic or mixed aliphatic/aromatic. Suitable polyhydroxy compounds are alkylene glycols such as glycol, 1,2-propanediol and 1,3-propanediol, 1,4-butanediol, neopentyl glycol, hexane-1,6-diol, cyclohexanedimethanol, 2,2-bis(4'-hydroxycyclohexyl)propane, and polyhydric alcohols such as trishydroxyalkylalkanes (e.g., trimethylolpropane) or tetrakishydroxyalkylalkanes (e.g., pentaerythritol). Other polyhydroxy compounds suitable for esterification may also be used.

Suitable polycarboxylic acids having from 2 to 18 carbon atoms in the molecule are, for example, phthalic acid, isophthalic acid, terephthalic acid, tetrahydrophthalic acid, hexahydrophthalic acid, succinic acid, adipic acid, azelaic acid, sebacic acid, maleic acid, glutaric acid, hexachloroheptanedicarboxylic acid, tetrachlorophthalic acid, trimellitic acid and pyromelletic acid. Instead of these acids it is also possible to use their anhydrides where these exist. Dimeric and trimeric fatty acids can also be employed as polycarboxylic acids. Other polycarboxylic acids suitable for esterification may also be used.

Other suitable polyhydroxypolyesters are derived from polylactones which are obtainable by, for example, reacting ε-caprolactone with polyols. Such products are described, for example, in U.S. Pat. No. 3,169,945, which reference is incorporated herein, in its entirety. The polylactone polyols obtained by this reaction are characterized by the presence of a terminal hydroxyl group and by recurring polyester units derived from the lactone. These recurring molecular units may be of the formula:

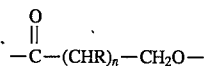

in which n is preferably from 4 to 6 and the substituent R is hydrogen, an alkyl radical, a cycloalkyl radical or an alkoxy radical, no substituent containing more than 12 carbon atoms and the total number of carbon atoms of the substituent in the lactone ring not exceeding 12.

The lactone used as starting material may be any desired lactone or any desired combination of lactones, although said lactone should preferably contain at least 6 carbon atoms in the ring, for example, from 6 to 8 carbon atoms, and preferably at least 2 hydrogen substituents should be present on the carbon atom attached to the oxygen group of the ring. The lactone used as starting material can be represented by the following formula:

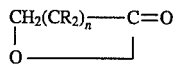

in which n and R are as already defined above.

The preferred lactones for the invention are the ε-caprolactones in which n is 4. The most preferred lactone is unsubstituted ε-caprolactone, in which n is 4 and all substituents R are hydrogen. This lactone is particularly preferred since it is available in large quantities and gives binders having outstanding properties. It is also possible to use various other lactones, individually or in combination.

Examples of aliphatic polyols which are suitable for reaction with the lactone are ethylene glycol, 1,3-propanediol, 1,4-butanediol, 1,6-hexanediol, dimethylolcyclohexane, trimethylolpropane and pentaerythritol. Other polyols suitable for reaction with the lactone may also be used.

The polyhydroxypolyester amides (A3) are derived, for example, from polycarboxylic acids and amino alcohols as a mixture with polyhydroxy compounds. Suitable polycarboxylic acids and polyhydroxy compounds are described under (A2), while examples of suitable amino alcohols are ethanolamine and monoisopropanolamine. Other suitable amino alcohols can also be used.

The polyhydroxypolycarbonates (A4) are preferably polycarbonatediols of the formula:

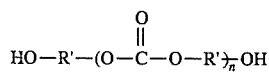

in which R' is an alkylene radical. These OH functional polycarbonates can be prepared by reaction of polyols, such as 1,3-propanediol, 1,4-butanediol, 1,6-hexanediol, diethylene glycol, triethylene glycol, 1,4-bishydroxymethylcyclohexane, 2,2-bis(4'-hydroxycyclohexyl)propane, neopentyl glycol, trimethylolpropane and pentaerythritol, with dicarbonates such as dimethyl, diethyl or diphenyl carbonate, or with phosgene. Mixtures of such polyols can also be employed. Other suitable polyols and dicarbonates can also be employed.

The polyhydroxypolyolefins (A5) are generally derived, for example, from oligomeric and polymeric olefins preferably having at least two terminal hydroxyl groups, with α,ω-dihydroxypolybutadiene being preferred.

Further polyhydroxy compounds (A), which are likewise suitable, are, inter alia, polyacetals, polysiloxanes and alkyd resins.

The polyisocyanates (B) are preferably any of those conventionally used in polyurethane chemistry. Examples of suitable polyisocyanates include trimethylene diisocyanate, tetramethylene diisocyanate, pentamethylene diisocyanate, hexamethylene diisocyanate, 1,5-diisocyanato-2-methylpentane, 1,12-diisocyanatododecane, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-tolylene diisocyanate, 2,6-tolylene diisocyanate, 4,4'-biphenylene diisocyanate, 1,5-naphthylene diisocyanate, 1,4-naphthylene diisocyanate, 1-isocyanatomethyl-5-isocyanato-1,3,3-trimethylcyclohexane, bis(4-isocyanatocyclohexyl)methane, 2,2-bis(4'-isocyanatocyclohexyl)propane, 4,4'-diisocyanatodiphenyl ether, 2,3-bis(8-isocyanatooctyl)-4-octyl-5-hexylcyclohexene, tetramethylxylylene diisocyanate, and isocyanurates and allophanates of the above diisocyanates. Mixtures of such polyisocyanates can also be employed. Any other polyisocyanates (B) suitable for polyurethane-vinyl hybrid dispersion may also be used.

The vinyl monomers (C) contain at least one vinyl group and at least one group which is reactive toward isocyanate, such as hydroxyl, mercapto and amino groups. Any such vinyl groups may be used. Other groups reactive toward isocyanate may also be used. Aliphatic hydroxyvinyl compounds having up to 25 carbon atoms are preferred.

Terminal vinyl groups are generally obtained by reacting macromonomers containing isocyanate groups with vinyl compounds (C1) which contain a group which is reactive toward isocyanate groups, and also by reacting macromonomers containing isocyanate groups with vinyl compounds (C2) which contain two or more groups which are reactive toward isocyanate groups, provided the number of isocyanate groups is less than that of the groups which are reactive toward isocyanate.

Lateral vinyl groups may be obtained by reacting macromonomers containing isocyanate groups with vinyl compounds (C2) which contain two or more groups which are reactive toward isocyanate groups, with the proviso that the number of isocyanate groups exceeds that of the groups which are reactive toward isocyanate.

Suitable monovinyl monohydroxy compounds which are especially useful as monomer (c) generally hydroxyalkyl esters of α,β-unsaturated carboxylic acids, for example, hydroxyethyl(meth)acrylate, hydroxypropyl(meth)acrylate and hydroxybutyl(meth)acrylate. Other suitable monovinyl monohydroxy compounds may also be used. Other examples are amino-containing (meth)acrylates, reaction products of monoepoxides and α-β-unsaturated carboxylic acids, such as that of Versatic acid glycidyl ester and (meth)acrylic acid, and reaction products of α,β-unsaturated glycidyl esters or ethers with monocarboxylic acids, for example, that of glycidyl methacrylate with stearic acid or linseed oil fatty acid. Suitable monovinyl dihydroxy compounds are bis(hydroxyalkyl)vinyl compounds such as glycerol monovinyl ether, glycerol monoallyl ether and glycerol mono(meth)acrylate, or the corresponding compounds derived from trimethylolpropane. Further examples include adducts of α,β-unsaturated carboxylic acids, such as (meth)acrylic acid, with diepoxides, for example, bisphenol (A) diglycidyl ether and hexanediol diglycidyl ether; adducts of dicarboxylic acids, for example, adipic acid, terephthalic acid or the like, with glycidyl (meth)acrylates. Divinyl dihydroxy compounds and monovinyl trihydroxy compounds are also suitable and can be prepared, for example, from pentaerythritol by etherification or esterification of one or two hydroxyl groups with vinyl compounds. These compounds lead to branched structures.

The hydrophilic monomers (D) may be selected from any hydrophilic monomers, and are preferably polyisocyanates (Di) or polyhydroxy compounds (Dh), which contain hydrophilic groups in the molecule. The monomers of group (Dh) also includes other compounds with hydrophilic groups which possess two or more groups which are reactive toward isocyanate, such as, polyamino and polymercapto compounds having a hydrophilic group in the molecule. Such hydrophilic groups of either groups of monomers are either nonionic (n), for example, polyalkylene oxide groups such as polyethylene oxide or polypropylene oxide groups, or mixed polyethyleneoxypropyleneoxy groups, or are present in ionic form (as salt) or are capable of forming ions when in contact with polar solvents such as water. In this case, the monomer may carry an anionic or anionogenic group (a), for example, a carboxylate, sulfonate or phosphonate group, or a cationic or cationogenic group (c), for example, a (substituted) ammonium or amino group.

The monomers of group (Di), namely polyisocyanates having hydrophilic groups, are preferably employed in the case of reaction with hydroxy-terminated urethane prepolymers, while the monomers of group (Dh), namely hydrophilic compounds having one or more groups which are reactive toward isocyanate, are preferably employed in the case of reaction with isocyanate-terminated urethane prepolymers. Examples of suitable monomers of class (Din) are reaction products of monohydroxy polyethers, such as polyethylene glycol monobutyl ether, with polyisocyanates having a functionality of at least three. Other suitable monomers of class (Din) may also be used.

Examples of suitable monomers of class (Dhn) are reaction products of diisocyanates containing groups of different reactivity with a polyalkylene glycol, exhibiting an isocyanate function, followed by reaction of this isocyanate with a dialkanolamine such as diethanolamine. Other suitable monomers of class (Dhn) may also be used.

Suitable monomers of class (Dha) are preferably diols containing an ionic group in the form of the carboxyl, phosphono or sulfo group. Examples of this group of monomers are bishydroxycarboxylic acids of 2 to 10 carbon atoms, such as dihydroxypropionic acid, dimethylol propionic acid, dihydroxyethyl propionic acid, dimethylolbutyric acid, 2,2-dihydroxysuccinic acid, tartaric acid, dihydroxy tartaric acid, dihydroxymaleic acid, dihydroxybenzoic acid, 3-hydroxy-2-hydroxymethylpropanesulfonic acid and 1,4-dihydroxybutanesulfonic acid. These monomers are preferably neutralized before the reaction, using a tertiary amine such as, for example, trimethylamine, triethylamine, dimethylaniline, diethylaniline or triphenylamine, in order to avoid the acid group reacting with the isocyanate. If the probability of such a reaction is low, it is possible not to neutralize the acid groups until after their incorporation into the polyurethane macromonomer.

Examples of suitable monomers of class (Dhc) are monoalkyldialkanolamines, such as N-methyldiethanolamine, or dialkyldialkanolammonium compounds. Other suitable monomers of class (Dhc) may also be used.

The vinyl monomers (E) are carbonyl-containing vinyl monomers (Ec), alone or as a mixture with other vinyl monomers (En) which do not contain carbonyl groups.

The vinyl monomers (Ec) contain vinyl groups and at least one carbonyl group. Examples of such vinyl monomers are methyl vinyl ketone, (meth)acrolein, crotonaldehyde, diacetone(meth)acrylamide, diacetone (meth)acrylate and mixed esters of aliphatic diols with (meth)acrylic acid and acetoacetic acid. However, other vinyl monomers containing vinyl groups and at least one carbonyl group may also be used.

The other vinyl monomers suitable for the invention, namely, the class (En) devoid of carbonyl groups, are preferably the vinyl monomers which can be polymerized by a free-radical procedure in aqueous emulsion. These vinyl monomers may be aromatic vinyl compounds, for example, styrene, vinyltoluenes and vinylnaphthalene; vinyl esters such as vinyl acetate; vinyl halides such as vinyl chloride or vinyl fluoride; vinyl ethers; vinyl heterocycles such as N-vinylcarbazole, (meth)acrylonitrile; the esters, imides or amides of unsaturated carboxylic acids such as (meth)acrylic acid, (iso)crotonic acid or vinylacetic acid with linear or branched alcohols such as methanol, ethanol, propanol, butanol, 2-ethylhexanol or lauryl alcohol, or any other aliphatic alcohol having 1 to 12 carbon atoms.

Other suitable vinyl monomers are hydroxyalkyl esters of these carboxylic acids, such as hydroxyethyl or hydroxypropyl (meth)acrylate, and other vinyl compounds which have already been given under component (C), for example, glycidyl (meth)acrylate. Other suitable vinyl monomers devoid of carbonyl groups can also be used.

The compounds with a hydrazide function, (F), generally contain two or more hydrazine, hydrazide or hydrazone groups.. The compounds (F) which preferably have a number average molecular weight ($M_n$) of <1.000 can be aliphatic, aromatic or mixed aliphatic/aromatic compounds and mixtures thereof. Examples of such compounds are bishydrazides of dicarboxylic acids having 2 to 12 carbon atoms, such as the bishydrazides of oxalic acid, malonic acid, succinic acid, glutaric acid, adipic acid, pimelic acid, suberic acid, azelaic acid, sebacic acid or the isomeric phthalic acids; carbonic acid bis-hydrazide, alkylene-or cycloalkylene-bis-semicarbazides, N,N'-diaminoguanidine, alkylenebishydrazines such as N,N'-diaminopiperazine, arylenebishydrazines such as phenylene- or naphthylenebishydrazine, alkylenebissemicarbazides, and bishydrazides of dialdehydes and diketones. Compounds (F) of higher functionality are, for example, the hydrazides of nitrilotriacetic acid or of ethylenediaminetetraacetic acid.

Vinyl containing urethane macromonomers according to the invention can be prepared by various reaction steps or routes described below. However, the vinyl containing urethane macromonomer can also be produced by any other suitable reaction route other than those described below.

One route comprises first preparing a polyaddition product by polyaddition of polyhydroxy compounds (A) and polyisocyanates (B). The reaction products (AB) of isocyanate functionality (ABi) can then be reacted further, with monomers of the type (C1), to give products (ABC1). The isocyanate-functional products (ABC1i) can be reacted further, with monomers of the type (Dh), to give products (ABC1Dh). If in the reaction all of the isocyanate groups have reacted, or terminal hydroxyl groups have now formed, the products can be put to further use directly.

Any remaining terminal isocyanate groups are preferably reacted with alcohols, with primary or secondary amines or with thiols to give urethanes, ureas or thiourethanes, and only then are these products used further. Although any suitable alcohols, primary or secondary amines or thiols can be used, compounds especially suitable for this purpose are, for example, primary amines such as propylamine, butylamine, pentylamine, 2-amino-2-methylpropanol, ethanolamine and propanolamine; secondary amines such as diethanolamine, dibutylamine and diisopropanol amine; primary alcohols such as methanol, ethanol, propanol, butanol, hexanol, dodecanol and stearyl alcohol; secondary alcohols such as isopropanol and isobutanol, and the corresponding thioalcohols. The resulting products all have terminal vinyl groups.

The reaction of reaction products (ABi) with polyfunctional monomers (C2) can again lead to products (ABC2i) having terminal isocyanate groups, in which case all of the vinyl groups are lateral. The subsequent reaction with the compounds (Dh) leads to the finished urethane macromonomers, which can be treated further as described above if isocyanate functional groups remain. Otherwise the urethane macromonomers can be put directly to further use. In this route, in addition to the monomers (Dh) described above, monomers (Dh) may also contain only one group which is reactive toward isocyanate. Examples of suitable compounds are aminocarboxylic acids, aminosulfonic acids, aminophosphonic acids, hydroxycarboxylic acids or hydroxysulfonic acids, such as aminocaproic acid, aminoacetic acid, aminobutyric acid, aminolauric acid, hydroxybutyric acid, aminomethanesulfonic acid, aminoethanesulfonic acid, aminopropanesulfonic acid or the analogous aminophosphonic acids, salicylic acid, hydroxy stearic acid and 2-hydroxyethanesulfonic acid.

The hydroxy-functional structures (ABC2h), containing both lateral and terminal vinyl groups, are reacted with the isocyanate-functional monomers (Di) to give the urethane macromonomers, with the above-described procedure being used if isocyanate functions remain.

One variant comprises extending the chain of the intermediate formed initially from (A), (B) and (C), by reacting the isocyanate groups of this polyaddition product with monomers of the type (Dha), for example, diaminocarboxylic acids or diaminosulfonic acids.

Another preferred reaction route is the reaction of the products (ABi), firstly, with the monomers (Dh), to give products (ABDhi) containing isocyanate functions, which products can then be reacted with (C1) to give urethane macromonomers having terminal vinyl groups, or with (C2) to give urethane macromonomers having lateral with few or no terminal vinyl groups.

Reaction products (AB) containing hydroxyl functions (ABh) are reacted with monomers (Di) to give isocyanate-functional structures (ABDi), which react with monomers (C1) to give vinyl-terminal urethane macromonomers. With monomers (C2), the result is urethane macromonomers containing lateral vinyl groups with few or no terminal vinyl groups. The above-described procedure is used if isocyanate functions remain.

Instead of carrying out the reactions described above in separate steps, they can also be carried out in a smaller number of steps, for example, two steps or one step.

The urethane macromonomers are prepared by the conventional and known methods of urethane chemistry. In these methods the catalysts employed may be tertiary amines, for example, triethylamine, dimethylbenzylamine and diazabicyclooctane; and dialkyltin(IV) compounds, for example, dibutyltin dilaurate, dibutyltin dichloride and dimethyltin dilaurate. The reaction takes place without solvent in the melt, in the presence of a solvent, or in the presence of a so-called reactive diluent. Suitable solvents are those which can be removed subsequently by distillation or by entrainment with water. Examples include methyl ethyl ketone, methyl isobutyl ketone, acetone, tetrahydrofuran, toluene and xylene. These solvents may be distilled off, completely or partially, after the preparation of the polyurethane macromonomers or after the free-radical polymerization. In addition, it is also possible to employ water-dilutable, high-boiling solvents, for example, N-methylpyrrolidone, which then remain in the dispersion. The so-called reactive diluents are vinyl monomers (E), which are copolymerized in the final stage with the vinyl-containing macromonomers.

The macromonomers obtained by the above-described process variants are then neutralized, in case the ionic groups in the monomers Containing such groups were not neutralized earlier.

The neutralization of the acidic compounds is preferably carried out using aqueous solutions of alkali metal hydroxides, or with amines, for example, with trimethylamine, triethylamine, dimethylaniline, diethylaniline, triphenylamine, dimethylbenzylamine, dimethylethanolamine, aminomethylpropanol, or dimethylisopropanolamine, or with ammonia. In addition the neutralization can also be carried out using mixtures of amines and ammonia. Other suitable bases can also be used.

Alkaline compounds are preferably neutralized, for example, using aqueous solutions of inorganic acids, such as hydrochloric acid or sulfuric acid, or organic acid such as acetic acid. Other suitable acids may also be used.

For the preparation of the polyurethane-vinyl hybrid dispersions according to the present invention, the urethane macromonomers obtained by the above-described preparation variants, which contain vinyl groups and may also already contain vinylmonomers (E), are converted to an aqueous dispersion by addition of water. After addition of (further) vinyl monomers (E) of which at least one (Ec) contains a carbonyl group, the macromonomers are polymerized by free radical-initiated polymerization by methods known per se.

The content of vinyl blocks in the resultant polymer is from about 1 to about 95% by weight, preferably from about 5 to about 70% by weight, based on the total weight of the solids content of the polyurethane-vinyl hybrid dispersion. The ratio of "soft" to "hard" segments in the urethane macromonomers is generally from about 0.30 to about 6, and with particular preference is from about 0.8 to about 3. For definition of "soft" and "hard" respectively, see "Developments in Polyurethane-1", chapter 3, page 34, Elsevier Applied Science Publishers, 1984. Suitable initiators for the polymerization are the known free-radical initiators, such as ammonium peroxodisulfate, potassium peroxodisulfate, sodium peroxodisulfate, and hydrogen peroxide. Organic peroxides such as cumene hydroperoxide, t-butyl hydroperoxide, di-tert-butyl peroxide, dioctyl peroxide, tert-butyl perpivalate, tert-butylperisononanoate, tert-butylperethylhexanoate, tert-butyl perneodecanoate, di-2-ethylhexyl peroxodicarbonate, diisotridecyl peroxodicarbonate, and azo compounds such as azobis(isobutyronitrile) and azobis(4-cyanovaleric acid). The conventional redox systems, for example, sodium sulfite, sodium dithionite, and ascorbic acid and organic peroxides or hydrogen peroxide are also suitable as initiators. Furthermore, regulators (thiols), emulsifiers, protective colloids and other conventional auxiliaries can also be added.

If the preparation of the macromonomers has been carried out in a solvent which can be removed by distillation and which forms with water an azeotrope having a boiling point below 100° C., for example, in acetone or xylene, then this solvent is finally removed from the dispersion by distillation. In each case, the result is an aqueous polyurethane dispersion. The acid numbers of these polyurethane dispersions are preferably in the range from about 5 to about 80 units, and with particular preference in the range from about 10 to about 40 units.

Preferred embodiments for the preparation of the macromonomers and for their copolymerization with the vinyl monomers (E), to give the polyurethane-vinyl hybrid dispersions according to the invention, are evident from the descriptions of the preferred process which follow.

The preferred processes described below, are given a numerical definition of the formula "X.Y.Z." X indicates whether or not a solvent is used in the process. Y indicates whether auxiliary solvents are used in the process. Z indicates whether the terminal groups are (1) OH groups, or (2) urethane, thiourethane or urea groups.
Process which is:
  1. solvent-free;
  1.1 without auxiliary solvents; and
  1.1.1 with terminal OH groups At temperatures of from about 100° to about 150° C., particularly preferably from about 120° to about 135° C., a monomer (Dh) (e.g., a polyhydroxy acid), together if desired with one or more monomers (C) and with low molecular weight polyols, is dissolved in a polyhydroxy compound (A) having an average molecular weight of from about 400 to about 5000 g/mol. The components are reacted with a polyisocyanate (B) or polyisocyanate mixtures (which, both here and in the following embodiments, may also contain the isocyanate-functional vinyl monomers (Di)) to give an OH-terminated urethane macromonomer having a number average molecular weight ($M_n$) of from about 500 to about 12,000 g/mol, particularly preferably from about 600 to about 8000 g/mol.

After this product has been cooled to a temperature of from about 30° to about 100° C., particularly preferably from about 50° to about 70° C., a vinyl monomer (reactive diluent) (E), which is not reactive toward isocyanates, and an NCO(isocyanate)-reactive vinyl compound (C2) which is preferably at least difunctional, are added. At this temperature, reaction is continued by further addition of polyisocyanate (B), which is present in a deficient quantity relative to the OH components, to give an OH-functional polyurethane macromonomer having an average molecular weight of from about 700 to about 24,000 g/mol, particularly preferably from about 800 to about 16,000 g/mol. After neutralization with amines or other bases, the resulting resin solution is dispersed in water. Further vinyl comonomers (Ec) and, if desired, (En) are added to the resulting dispersion before or during free-radical polymerization. Polymerization of the vinyl compounds is then carried out in the aqueous dispersion, with free-radical initiators at a temperature of from about 0° to about 95° C., particularly preferably from about 40° to about 95° C., and if redox systems are used at a temperature of from about 30° to about 70° C. This reaction produces a solvent-free polyurethane-vinyl hybrid dispersion.

Process 1.1.2—Same as 1.1.1 except with terminal urethane, thiourethane or urea groups.

At temperatures of from about 100° to about 150° C., particularly preferably from about 120° to about 135° C., a monomer (Dh) (e.g., a polyhydroxy acid), together if desired with low molecular weight polyols and with one or more monomers (C), is dissolved in a polyhydroxy compound (A) having an average molecular weight of from about 400 to about 5000 g/mol. The components are reacted with a polyisocyanate (B) or polyisocyanate mixtures to give an OH-terminated product having a number average molecular weight ($M_n$) of from about 500 to about 12,000 g/mol, particularly preferably from about 600 to about 8000 g/mol.

After this product has been cooled to a temperature of from about 30° to about 100° C., particularly preferably from about 50° to about 70° C., a vinyl monomer (reactive diluent) (E), which is not reactive toward isocyanate, and an NCO(isocyanate)-reactive vinyl compound (C2) which is at least difunctional, are added. At this temperature further polyisocyanate (B) is added to synthesize an NCO-terminated resin.

Further reaction with a monofunctional, isocyanate-reactive compound selected from alcohols, primary or secondary amines and thiols, is continued to give a polyurethane macromonomer having terminal hydrophilic groups, attached via a urethane, thiourethane or urea group, and having an average molecular weight of from about 700 to about 24,000 g/mol, particularly preferably from about 800 to about 16,000 g/mol.

After neutralization with amines or other bases, the resulting resin solution is dispersed in water. Further vinyl comonomers (Ec) and, if desired, (En) are added to the resulting dispersion before or during the free-radical polymerization. Polymerization is then carried out in the aqueous dispersion, with free-radical initiators at a temperature of from about 0° to about 95° C., particularly preferably from about 40° to about 95° C., and if redox systems are used at a temperature of from about 30° to about 70° C. This reaction produces a solvent-free polyurethane-vinyl hybrid dispersion.

Process 1.2.1—Identical to process 1.1.1, except for:
  1.2 with auxiliary solvent;
  1.2.1 with terminal OH groups.

In this process, as opposed to process 1.1.1, all of the components (A), (C) and (Dh) which are reactive toward isocyanate are dissolved in a solvent which can be removed from the aqueous phase by fractional distillation or which forms an azeotrope with water. The components (A), (C) and (Dh) in the solvent are reacted directly with a polyisocyanate (B) or with a polyisocyanate mixture to give an OH-terminated polyurethane macromonomer having a molecular weight of from about 500 to about 30,000 g/mol, preferably from about 700 to about 20,000 g/mol. The solvent content is from about 1 to about 80% by weight, particularly preferably between about 10 and about 50% by weight, based on the solids content of the polyurethane macromonomer. The temperature for this step is between about 30° and about 100° C., particularly preferably between about 50° and about 80° C.

After neutralization with amines or other bases the product is dispersed in water. The auxiliary solvent is then removed from the aqueous phase by distillation, under vacuum if appropriate. The vinyl monomers (Ec) and, if desired, (En) are added to this solvent-free dispersion before or during free-radical polymerization. Polymerization is then carried out, with free-radical initiators at a temperature between about 0° and about 95° C., particularly preferably between about 40° and about 95° C., and if redox systems are used at a temperature of from about 30° to about 70° C., to give a solvent-free polyurethane-vinyl hybrid dispersion. Process Identical to 1.2.1 except:

1.2.2 with terminal urethane, thiourethane or urea groups.

In this process, as opposed to process 1.1.2, all of the components (A), (C) and (Dh) which are reactive toward isocyanate are dissolved in a solvent which can be removed from the aqueous phase by fractional distillation or which forms an azeotrope with water. The components (A), (C) and (Dh) in the solvent are reacted directly with a polyisocyanate (B) or a polyisocyanate mixture to give an NCO(isocyanate)-terminated urethane macromonomer. The solvent content is from about 1 to about 80% by weight, preferably between about 10 and about 50% by weight, based on the solids content of the polyurethane macromonomer. The temperature for this step is between about 30° and about 100° C., particularly preferably between about 50° and about 80° C.

Further reaction with a monofunctional isocyanate reactive compound, preferably selected from alcohols, primary or secondary amines and thiols, is continued to give a polyurethane macromonomer containing urethane, thiourethane or urea groups and having a molecular weight of from about 500 to about 30,000 g/mol, particularly preferably from about 700 to about 20,000 g/mol. The product is neutralized with amines or other bases and dispersed in water.

The auxiliary solvent is then removed from the aqueous phase by distillation, under vacuum if appropriate. The vinyl monomers (Ec) and, if desired, (En) are added to this solvent-free dispersion before or during free-radical polymerization. Polymerization is then carried out, with free-radical initiators at a temperature of between about 0° and about 95° C., particularly preferably between about 40° and about 95° C., and if redox systems are used at a temperature of from about 30° to about 70° C., to give a solvent-free polyurethane-vinyl hybrid dispersion.

Suitable solvents in the processes according to 1.2.1 and 1.2.2 are, for example, acetone, tetrahydrofuran, dioxane, methyl ethyl ketone, methyl isobutyl ketone, toluene and xylene. Other suitable solvents may also be used.

2. Processes containing solvent

If a nondistillable auxiliary solvent such as, N-methylpyrrolidone, is used, the procedure is exactly as in processes 1.2.1 and 1.2.2, except that the distillation of the dispersion is omitted. The polymerization is carried out as in processes 1.2.1 and 1.2.2. The solvent content is generally in the range from about 0.1 to about 30% by weight, particularly preferably from about 1 to about 15% by weight, based on the overall binder dispersion.

Due to their chemical structure, the polyurethane-vinyl hybrid dispersions according to the present invention are suitable for a large number of applications. Examples include the production of coating systems, as binders for water-dilutable adhesives or as resins for printing inks.

Because of the crosslinking reaction of the autocrosslinking polyurethane dispersions according to the invention, which takes place in the course of film formation even at room temperature, these dispersions are outstandingly suitable for the production of chemical-, water- and heat-resistant coatings on thermally sensitive materials such as wood, paper and plastics.

The polyurethane-vinyl hybrid dispersions according to the present invention can be applied to a very wide variety of substrates, such as ceramic, composite materials, wood (e.g., true timber, veneers, chipboard and plywood, etc.) glass, concrete, leather and textiles, and in particular plastics, such as polycarbonates, polystyrene, polyvinyl chloride, polypropylene, polyethylene, RIM-PUR, polyesters, poly(meth)acrylates, acrylonitrile-butadiene-styrene polymers and the like, and especially to metals, such as iron, copper, aluminum, (galvanized) steel, brass, bronze, tin, zinc, titanium, magnesium and the like. The dispersions adhere to the various substrates without adhesion-promoting primers and/or interlayers. They can be combined and are generally compatible with other aqueous polymer dispersions and polymer solutions, for example, acrylic and/or methacrylic polymers, polyurethanes, polyurea resins, polyester resins and epoxy resins, thermoplastics based on polyvinyl acetate, polyvinyl chloride, polyvinyl ether, polychloroprene, polyacrylonitrile and acrylonitrile-butadiene-styrene copolymers, etc. They can also be combined with substances which have a thickening action, based on carboxyl-containing polyacrylates or polyurethanes, hydroxyethylcellulose, polyvinyl alcohols and inorganic thixotropic agents, such as bentonite, sodium-magnesium silicates and sodium-magnesium-fluorine-lithium silicates.

The polyurethane-vinyl hybrid dispersions according to the present invention are also suitable, for example, for the production of anticorrosion coatings and/or intermediate coatings for a wide variety of applications. Preferred applications include the production of metallic and solid-color basecoats in multicoat paint systems in the sectors of automotive finishing and the coating of plastics, and for the production of primer coats in the sector of plastics coating.

The binders made from the polyurethane disperions according to the invention are particularly suitable for the production of basecoats on substrates of all kinds (as described above) and in particular for the coating of wood and metals. In this context, the improved heat resistance, in conjunction with the good resistance to humidity, is a particularly preferred advantage.

Due to the short flash-off times of the basecoats based on the polyurethane dispersions according to the invention, the pigmented basecoat can be coated over with a clearcoat without having undergone a baking step (wet-on-wet method) and the coats can then be baked together or dried under forced conditions. Basecoats produced using the polyurethane dispersions according to the invention give coated films of equal quality, largely independent of the baking or drying temperature, so that they can be employed both as refinishes for motor vehicles and as a stoving lacquer in the production-line finishing of motor vehicles. In both cases, the resulting coated films have a good adhesion both to the substrate and to the original finish, and are highly resistant to humidity. Furthermore, the brightness of the coat is not notably impaired after a humidity test.

In the case of the formulation of water-thinnable coating materials using the polyurethane dispersions according to the invention, it is possible to add the crosslinking agents which are conventional in the paint industry, for example, water-soluble or water-emulsifiable melamine or benzoquanamine resins, polyisocyanates, epoxy resins, water-emulsifiable polyisocyanates or water-emulsifiable prepolymers having terminal isocyanate groups, water-soluble or water-dispersible polyazirridines and blocked polyisocyanates. The aqueous coating systems may also contain all the known inorganic and/or organic pigments and/or dyes which are conventional in paint technology, as well as auxiliaries, such as wetting agents, antifoams, leveling agents, waxes, slip additives, stabilizers, catalysts, fillers, plasticizers and solvents.

The coating systems based on the dispersions according to the invention can be applied by all of the application methods known to the person skilled in the art to the materials indicated above. Application (coating) techniques include brushing, roller coating, pouring, knife-coating, dipping and spraying (air, airless, air mix, etc.).

The polyurethane-vinyl hybrid dispersions according to the present invention can also be used directly for the adhesive bonding of any desired substrates. In order to achieve specific adhesive properties, the polyurethane-vinyl hybrid dispersions according to the invention may be mixed with other polymer dispersions or solutions (see above). Furthermore, in order to improve the thermal stability and peel strength it is possible to add crosslinking agents, for example, water-emulsifiable polyisocyanates or water-emulsifiable prepolymers containing terminal isocyanate groups, or water-soluble or water-emulsifiable melamine or benzoguanamine resins.

The adhesives based on the polyurethane-vinyl hybrid dispersions according to the present invention may contain additives which are conventional in adhesives technology, such as plasticizers, solvents, film-binding auxiliaries, fillers and synthetic and natural resins. The adhesives are especially suitable for the production of adhesive bonds for substrates in the automotive industry, for example, the adhesive bonding of interior components, and in the shoe industry, for example, for the bonding of the sole of the shoe to the upper. The preparation and processing of the adhesives based on the polyurethane-vinyl hybrid dispersions according to the invention are carried out by the conventional methods of adhesive technology as are applied in the case of aqueous dispersion adhesives and solution adhesives.

The polyurethane-vinyl hybrid dispersions according to the invention may, if desired as a mixture with other binders such as alkyd resins, and with the addition of soluble or insoluble dyes or pigments, be used for the production of printing inks.

The above examples of the uses of the polyurethane-vinyl hybrid dispersion and binders of the present invention are for illustration only and should not be constituted as limiting the other possible applications of the dispersion.

The invention is illustrated in more detail by the examples which follow:

EXAMPLE 1

Comparison Example: Non-Autocrosslinking Polyurethane-Vinyl Hybrid Dispersion 232.0 g of a polyester prepared from 1,6-hexanediol, isophthalic acid and adipic acid, having a hydroxyl number of 88 and an acid number of less than 2, are heated to 90° C. with 23.0 g of dimethylolpropionic acid, 10.9 g of 1,6-hexanediol and 82.8 g of N-methyl-2-pyrrolidone. 73.9 g of isophorone diisocyanate are then metered in over a period of from 25 to 30 minutes, with stirring. After a further 60 minutes, 80.0 g of methyl methacrylate and 0.2 g of 2,6-di-tert-butyl-4-methylphenol are added rapidly at a temperature of 90° C. and homogenized. After this 41.3 g of isophorone diisocyanate are metered in over a period of 10 minutes and the mixture is stirred at 90° C. until the content of free isocyanate groups is 1.11% by weight, based on the overall weight of the components weighed in. 18.9 g of 2-hydroxyethyl methacrylate are added to the resulting prepolymer solution. Reaction is continued until there are no further free isocyanate groups.

After addition of 53.3 g of methyl methacrylate and 11.4 g of dimethylethanolamine, 758.0 g of water at a temperature of 70° C. are added to the prepolymer solution with intensive stirring. Subsequently, at a temperature of 80° C., 0.7 g of tert-butyl hydroperoxide (80% strength in di-tert-butyl peroxide) are quickly added dropwise. After a further 30 minutes a solution of 1.3 g of ascorbic acid in 130.0 g of water is metered in over a period of 90 minutes.

The resulting polyurethane-acrylic hybrid dispersion is cooled to room temperature and filtered through a 5 μm filter cloth. The dispersion has a solids content of 36% and a pH of 7.3.

EXAMPLE 2

232.0 g of a polyester prepared from 1,6-hexanediol, isophthalic acid and adipic acid, having a hydroxyl number of 88 and an acid number of less than 2, are heated to 90° C. with 23.0 g of dimethylolpropionic acid, 10.9 g of 1,6-hexanediol and 82.8 g of N-methyl-2-pyrrolidone. Subsequently, 73.9 g of isophorone diisocyanate are metered in over a period of from 25 to 30 minutes, with stirring. After a further 60 minutes, 80.0 g of methyl methacrylate and 0.2 g of 2,6-di-tert-butyl-4-methylphenol are added rapidly at a temperature of 90° C. and homogenized. After this, 41.3 g of isophorone diisocyanate are metered in over a period of 10 minutes and the mixture is stirred at 90° C. until the content of free isocyanate groups is 1.11% by weight, based on the overall weight of the components weighed in. 18.9 g of 2-hydroxyethyl methacrylate are added to the resulting prepolymer solution. Reaction is continued until there are no further free isocyanate groups.

After addition of 37.3 g of methyl methacrylate, 16.0 g of diacetoneacrylamide and 11.4 g of dimethylethanolamine, 658.0 g of water at a temperature of 70° C. are added to the prepolymer solution with intensive stirring. Subsequently, at a temperature of 80° C., 0.7 g of tert-butyl hydroperoxide (80% strength in di-tert-butyl peroxide) are quickly added dropwise. After a further 30 minutes a solution of 1.3 g of ascorbic acid in 130.0 g of water is metered in over a period of 90 minutes.

The resulting polyurethane-acrylic hybrid dispersion is cooled to room temperature and filtered through a 5 μm filter cloth. Subsequently, 8.2 g of adipic acid dihydrazide, dissolved in 100 g of water, are added with stirring. The dispersion has a solids content of 36% and a pH of 7.5.

EXAMPLE 3

Comparison Example: Non-Autocrosslinking Polyurethane-Vinyl Hybrid Dispersion 232.0 g of a polyester prepared from neopentylglycol, 1,6-hexanediol, isophthalic acid and adipic acid and having a hydroxyl number of 41 and an acid number of less than 2 are dissolved, together with 23.0 g of dimethylolpropionic acid and 2.4 g of 1,4-butanediol, in 175.8 g of methyl ethyl ketone at reflux. Subsequently, 93.3 g of 4,4'-dicyclohexylmethane diisocyanate are metered in over a period of from 30 to 35 minutes with stirring, and the mixture is stirred at reflux temperature until the content of free isocyanate groups is 1.16% by weight, based on the overall weight of the components weighed in. 0.2 g of 2,6-di-tert-butyl-4-methylphenol and 49.3 g of a reaction product of Versatic acid glycidyl ester with methacrylic acid are added to the resulting prepolymer solution. Reaction is continued at reflux temperature until there are no further free isocyanate groups.

After addition of 13.0 g of triethylamine, 1000.2 g of water at a temperature of 60° C. are added to the prepolymer solution with intensive stirring. The solvent, methyl ethyl ketone, is subsequently removed from the resulting dispersion azeotropically, by vacuum distillation. After addition of 107.7 g of methyl methacrylate, 107.7 g of 2-ethylhexyl acrylate and 0.7 g of tert-butyl hydroperoxide (80% strength in di-tert-butyl peroxide) the temperature is increased to 80° C. After a further 30 minutes 1.3 g of ascorbic acid dissolved in 130 g of water are metered in over a period of 90 minutes.

The resulting polyurethane-acrylic hybrid dispersion is cooled to room temperature and filtered through a 5 μm filter cloth. The dispersion has a solids content of 35% and a pH of 7.4.

EXAMPLE 4

232.0 g of a polyester prepared from neopentylglycol, 1,6-hexanediol, isophthalic acid and adipic acid and having a hydroxyl number of 41 and an acid number of less than 2 are dissolved, together with 23.0 g of dimethylolpropionic acid and 2.4 g of 1,4-butanediol, in 175.8 g of methyl ethyl ketone at reflux. Subsequently, 93.3 g of 4,4'-dicyclohexylmethane diisocyanate are metered in over a period of from 30 to 35 minutes with stirring and the mixture is stirred at reflux temperature until the content of free isocyanate groups is 1.16% by weight, based on the overall weight of the components weighed in. 0.2 g of 2,6-di-tert-butyl-4-methylphenol and 49.3 g of a reaction product of Versatic acid glycidyl ester with methacrylic acid are added to the resulting prepolymer solution. Reaction is continued at reflux temperature until there are no further free isocyanate groups.

After addition of 13.0 g of triethylamine, 900.2 g of water at a temperature of 60° C. are added to the prepolymer solution with intensive stirring. The solvent, methyl ethyl ketone, is subsequently removed from the resulting dispersion azeotropically, by vacuum distillation. After addition of 92.3 g of methyl methacrylate, 92.3 g of 2-ethylhexyl acrylate and 30.8 g of diacetoneacrylamide and 0.7 g of tert-butyl hydroperoxide (80% strength in di-tert-butyl peroxide) the temperature is increased to 80° C. After a further 30 minutes 1.3 g of ascorbic acid dissolved in 130 g of water are metered in over a period of 90 minutes.

The resulting polyurethane-acrylic hybrid dispersion is cooled to room temperature and filtered through a 5 μm filter cloth. Subsequently, 15.8 g of adipic acid dihydrazide, dissolved in 100 g of water, are added. The dispersion has a solids content of 34% and a pH of 7.6.

EXAMPLE 5

Comparison Example: Non-Autocrosslinking Polyurethane-Vinyl Hybrid Dispersion 285.6 g of a polyester prepared from 1,6-hexanediol, isophthalic acid and adipic acid, having a hydroxyl number of 80 and an acid number of less than 2 are dissolved, together with 22.1 g of dimethylolpropionic acid and 2.5 g of 1,4-butanediol, 10.5 g of glycerol methacrylate and 0.2 g of 2,6-di-tert-butyl-4-methylphenol, in 120 g of acetone at reflux. Subsequently, 99.3 g of 4,4'-dicyclohexylmethane diisocyanate are metered in over a period of from 30 to 40 minutes with stirring. Stirring is continued at reflux temperature until there are no further free isocyanate groups.

After addition of 12.5 g of triethylamine, 1092.2 g of water at a temperature of 60° C. are added to the prepolymer solution with intensive stirring. The solvent, acetone, is subsequently removed from the resulting dispersion by vacuum distillation. After addition of 90.0 g of methyl methacrylate, 90.0 g of n-butyl acrylate and 0.7 g of tert-butyl hydroperoxide (80% strength in di-tert-butyl peroxide) the temperature is increased to 80° C. After a further 30 minutes a solution of 1.3 g of ascorbic acid in 130 g of water is metered in over a period of 60 minutes.

The resulting polyurethane-acrylic hybrid dispersion is cooled to room temperature and filtered through a 5 μm filter cloth. The dispersion has a solids content of 34% and a pH of 7.2.

EXAMPLE 6

285.6 g of a polyester prepared from 1,6-hexanediol, isophthalic acid and adipic acid, having a hydroxyl number of 80 and an acid number of less than 2 are dissolved, is combined together with 22.1 g of dimethylolpropionic acid and 2.5 g of 1,4-butanediol, 10.5 g of glycerol methacrylate and 0.2 g of 2,6-di-tert-butyl-4-methylphenol, in 120 g of acetone at reflux. Subsequently, 99.3 g of 4,4'-dicyclohexylmethane diisocyanate are metered in over a period of from 30 to 40 minutes with stirring. Stirring is continued at reflux temperature until there are no further free isocyanate groups.

After the addition of 12.5 g of triethylamine, 992.2 g of water at a temperature of 60° C. are added to the prepolymer solution with intensive stirring. The solvent, acetone, is subsequently removed from the resulting dispersion by vacuum distillation. After addition of 75.0 g of methyl methacrylate, 75.0 g of n-butyl acrylate and 30.0 g of diacetoneacrylamide and 0.7 g of tert-butyl hydroperoxide (80% strength in di-tert-butyl peroxide) the temperature is increased to 80° C. After a further 30 minutes, a solution of 1.3 g of ascorbic acid and 130.0 g of water is metered in over a period of 60 minutes.

The resulting polyurethane-acrylic hybrid dispersion is cooled to room temperature and filtered through a 5 μm filter cloth. Subsequently, 15.4 g of adipic acid dihydrazide, dissolved in 100.0 g of water, are added. The dispersion has a solids content of 34% and a pH of 7.4.

The novel, autocrosslinking polyurethane-acrylic hybrid dispersions are distinguished by improved water, solvent and chemical resistance.

A comparative test of noncrosslinking and autocrosslinking coating systems based on the polyurethane-acrylic hybrid dispersions of Examples 1–6 was carried out in accordance with the furniture standards DIN 68861, Part 1B. The wetting agent Byk 346 (manufacturer: Byk Chemie GmbH) and the coalescence agent butyldiglycol (=BDG) were added to the dispersions before the application of the latter to mahogany-veneered wood panels. A wet film of the varnishes prepared in this way with a film thickness of 150 μm, was applied twice to the test panels. After a drying phase of 10 days at room temperature, the resistance to the substances listed in the table below was determined.

EXAMPLE 7

232.0 g of a polyester prepared from 1,6-hexanediol, isophthalic acid and adipic acid, having a hydroxyl number of 88 and an acid number of less than 2 are heated to 90° C. together with 23.0 g of dimethylolpropionic acid, 10.9 g of 1,6-hexanediol and 82.8 g of N-methyl-2-pyrrolidone. Subsequently, 83.2 g of diphenylmethane 4,4'-diisocyanate are metered in over a period of from 25 to 30 minutes with stirring. After a further 60 minutes, 80 g of methyl methacrylate and 0.2 g of 2,6-di-tert-butyl-4-methylphenol are added rapidly at a temperature of 90° C. and homogenized. After this 46.5 g of diphenylmethane 4,4'-diisocyanate are metered in over a period of 10 minutes, and the mixture is stirred at 90° C. until the content of free isocyanate groups is 1.11% by weight, based on the overall weight of the components weighed in. 18.9 g of 2-hydroxyethyl methacrylate are added to the resulting prepolymer solution. Reaction is continued until there are no further free isocyanate groups.

After the addition of 37.3 g of methyl methacrylate, 16.0 g of diacetoneacrylamide and 11.4 g of dimethylethanolamine, 672.5 g of water at a temperature of 70° C. are added to the prepolymer solution with intensive stirring. Subsequently, at a temperature of 80° C., 0.7 g of tert-butyl hydroperoxide (80% strength in di-tert-butyl peroxide) are added dropwise rapidly. After a further 30 minutes a solution of 1.3 g of ascorbic acid in 130.0 g of water is metered in over a period of 90 minutes.

The resulting polyurethane-acrylic hybrid dispersion is cooled to room temperature and filtered through a 5 µm filter cloth. Subsequently, 8.2 g of adipic acid dihydrazide, dissolved in 100 g of water, are added with stirring. The dispersion has a solids content of 37% and a pH of 7.7.

EXAMPLE 8

232.0 g of a polyester prepared from 1,6-hexanediol, isophthalic acid and adipic acid, having a hydroxyl number of 88 and an acid number of less than 2, are heated to 90° C. together with 23.0 g of dimethylolpropionic acid, 10.9 g of 1,6-hexanediol and 82.8 g of N-methyl-2-pyrrolidone. Subsequently, 57.9 g of tolylene diisocyanate (isomer mixture: 20% 2,6 isomer, 80% 2,4 isomer) are metered in over a period of from 25 to 30 minutes with stirring. After a further 60 minutes, 80 g of methyl methacrylate and 0.2 g of 2,6-di-tert-butyl-4-methylphenol are added rapidly at a temperature of 90° C. and homogenized. After this 32.4 g of tolylene diisocyanate (isomer mixture: 20% 2,6 isomer, 80% 2,4 isomer) are metered in over a period of 10 minutes, and the mixture is stirred at 90° C. until the content of free isocyanate groups is 1.11% by weight, based on the overall weight of the components weighed in. 18.9 g of 2-hydroxyethyl methacrylate are then added to the resulting prepolymer solution. Reaction is continued until there are no further free isocyanate groups.

After the addition of 37.3 g of methyl methacrylate, 16.0 g of diacetone acrylamide and 11.4 g of dimethylethanolamine, 672.5 g of water at a temperature of 70° C. are added to the prepolymer solution with intensive stirring. Subsequently, at a temperature of 80° C., 0.7 g of tert-butyl hydroperoxide (80% strength in di-tert-butyl peroxide) are added dropwise rapidly. After a further 30 minutes a solution of 1.3 g of ascorbic acid in 130.0 g of water is metered in over a period of 90 minutes.

The resulting polyurethane-acrylic hybrid dispersion is cooled to room temperature and filtered through a 5 µm filter cloth. Subsequently, 8.2 g of adipic acid dihydrazide, dissolved in 100 g of water, are added with stirring. The dispersion has a solids content of 36% and a pH of 7.2.

EXAMPLE 9

232.0 g of a polyester prepared from neopentyl glycol, 1,6-hexanediol, isophthalic acid and adipic acid, having a hydroxyl number of 41 and an acid number of less than 2, are dissolved together with 23.0 g of dimethylolpropionic acid and 2.4 g of 1,4-butanediol in 175.8 g of methyl ethyl ketone at reflux. Subsequently, 89.1 g of diphenylmethane 4,4'-diisocyanate are metered in over a period of from 30 to 35 minutes with stirring. Stirring is continued at reflux until the content of free isocyanate groups is 1.16% by weight, based on the overall weight of the components weighed in. 0.2 g of 2,6-di-tert-butyl-4-methylphenol and 49.3 g of reaction product of Versatic acid glycidyl ester with methacrylic acid are then added to the resulting prepolymer solution. The reaction is continued at reflux temperature until there are no further free isocyanate groups.

After addition of 13.0 g of triethylamine, 969.0 g of water at a temperature of 60° C. are added to the prepolymer solution with intensive stirring. The solvent, methyl ethyl ketone, is subsequently removed from the resulting dispersion azeotropically, by vacuum distillation. After addition of 92.3 g of methyl methacrylate, 92.3 g of 2-ethylhexyl acrylate, 30.8 g of diacetoneacrylamide and 0.7 g of tert-butyl hydroperoxide (80% strength in di-tert-butyl peroxide) the temperature is increased to 80° C. After a further 30 minutes a solution of 1.3 g of ascorbic acid in 130.0 g of water is metered in over a period of 90 minutes.

The resulting polyurethane-acrylic hybrid dispersion is cooled to room temperature and filtered through a 5 µm filter cloth. Subsequently, 15.8 g of adipic acid dihydrazide, dissolved in 100 g of water, is added with stirring. The dispersion has a solids content of 38% and a pH of 7.5.

EXAMPLE 10

232.0 g of a polyester prepared from neopentyl glycol, 1,6-hexanediol, isophthalic acid and adipic acid, having a hydroxyl number of 41 and an acid number of less than 2, are dissolved together with 23.0 g of dimethylolpropionic acid and 2.4 g of 1,4-butanediol in 175.8 g of methyl ethyl ketone at reflux. Subsequently, 62.0 g of tolylene diisocyanate (isomer mixture: 20% 2,6 isomer, 80% 2,4 isomer) are metered in over a period of from 30 to 35 minutes with stirring. The mixture is stirred at reflux until the content of free isocyanate groups is 1.16% by weight, based on the overall weight of the components weighed in. 0.2 g of 2,6-di-tert-butyl-4-methylphenol and 49.3 g of the reaction product of Versatic acid glycidyl ester with methacrylic acid are added to the resulting prepolymer solution. The reaction is continued at reflux temperature until there are no further free isocyanate groups.

After addition of 13.0 g of triethylamine, 942.0 g of water at a temperature of 60° C. are added to the prepolymer solution with intensive stirring. The solvent, methyl ethyl ketone, is subsequently removed from the resulting dispersion azeotropically, by vacuum distillation. After addition of 92.3 g of methyl methacrylate, 92.3 g of 2-ethylhexyl acrylate, 30.8 g of diacetoneacrylamide and 0.7 g of tert-butyl hydroperoxide (80% strength in di-tert-butyl peroxide) the temperature is increased to 80° C. After a further 30 minutes a solution of 1.3 g of ascorbic acid in 130.0 g of water is metered in over a period of 90 minutes.

The resulting polyurethane-acrylic hybrid dispersion is cooled to room temperature and filtered through a 5 μm filter cloth. Subsequently, 15.8 g of adipic acid dihydrazide, dissolved in 100 g of water, is added with stirring. The dispersion has a solids content of 37% and a pH of 7.0.

It is intended that the specification be considered as exemplary only. Other embodiments of the invention will become apparent to those skilled in the art from consideration of the specification and practice of the invention disclosed herein.

TABLE

| PU dispersion | Resistance to water, solvents and chemicals[*] | | | | | |
|---|---|---|---|---|---|---|
| | Example 1 | Example 2 | Example 3 | Example 4 | Example 5 | Example 6 |
| Co-solvent BDG[a] | 3% | 3% | 35 | 3% | 3% | 3% |
| Wetting agent Byk 346[a] | 0.10% | 0.10% | 0.10% | 0.10% | 0.10% | 0.10% |
| 16 h water | 1–2 | 0 | 1–2 | 0 | 2–3 | 0–1 |
| 16 h ethanol, 50% | 3 | 2 | 2–3 | 1 | 2–3 | 1–2 |
| 16 h ink | 1 | 0 | 1 | 0 | 2 | 1 |
| 20 h dibutyl-phthalate | 4 | 3 | 3–4 | 2 | 5 | 3 |
| 1 h acetic acid, 5% | 2–3 | 2 | 3 | 0–1 | 2 | 1 |
| 2 min ammonia, 10% | 2 | 0 | 2 | 0 | 2 | 0 |
| 10 s acetone | 2 | 1 | 2–3 | 1 | 3 | 1 |

[*]Evaluation: 0 = no visible changes, 5 = test area heavily altered or destroyed
Exposure time: h = hours, min = minutes, s = seconds
[a]Data in % by weight based on the ready-to-use formulation

What is claimed is:

1. A process for the production of an aqueous, autocrosslinking polymer dispersion binder which comprises polyhydrazides and carbonyl-containing urethane-vinyl hybrid polymers, which are composed of vinyl-containing urethane macromonomer blocks and vinyl blocks derived from further vinyl monomer units, at least one of which contains one or more carbonyl groups, said process comprising the steps of:
   (a) reacting polyhydroxy compounds, polyisocyanates, vinyl monomers, and hydrophilic monomers which contain hydrophilic groups to form a vinyl-containing urethane macromonomer;
   (b) dispersing said vinyl-containing urethane macromonomer in water;
   (c) reacting said dispersed vinyl-containing urethane macromonomer with further vinyl monomers by free radical-initiated polymerization, wherein at least one of the further vinyl monomers contains one or more carbonyl groups, to form a carbonyl-containing polyurethane-vinyl hybrid; and
   (d) adding an effective crosslinking amount of a polyhydrazide.

2. A process for the production of an aqueous, autocrosslinking polymer dispersion binder as claimed in claim 1, wherein said hydrophilic monomers are selected from the group consisting of isocyanate-functional polyalkylene oxides, hydroxy-functional polyalkylene oxides, hydroxy-functional anionic, anionogenic, cationic or cationogenic compounds, and mixtures thereof.

3. A process for the production of an aqueous, autocrosslinking polymer dispersion binder as claimed in claim 1, wherein in step (a), at least a portion of said polyhydroxy compounds, polyisocyanates, vinyl monomers, and hydrophilic monomers which contain hydrophilic groups is reacted in a solvent, and wherein in step (b), at least a portion of said solvent is removed by distillation after said macromonomer is dispersed in water.

4. A process for the production of an aqueous, autocrosslinking polymer dispersion as claimed in claim 1, wherein in step (a), at least a portion of said polyhydroxy compounds, polyisocyanates, vinyl monomers, and hydrophilic monomers which contain hydrophilic groups is reacted in a non-distillable auxiliary solvent.

5. A process for the production of an aqueous, autocrosslinking polymer dispersion as claimed in claim 1, wherein in step (a), said hydroxyl group containing monomers are present in excess relative to isocyanate group containing monomers are present to produce said urethane macromonomers having hydroxyl containing terminal groups.

6. A process for the production of an aqueous, autocrosslinking polymer dispersion binder as claimed in claim 1, wherein in step (a), said isocyanate containing monomers are present in excess relative to the hydroxyl group containing monomers to produce an isocyanate terminated resin, and further reacting said isocyanate terminated resin with a monofunctional, isocyanate-reactive compound selected from the group consisting of alcohols, primary or secondary amines, thiols and mixtures thereof; to produce said urethane macromonomer having end groups selected from the group consisting of urethane, thiourethane, urea and mixtures thereof.

* * * * *